(12) United States Patent
Mochizuki

(10) Patent No.: US 11,456,762 B2
(45) Date of Patent: Sep. 27, 2022

(54) CONTROL DEVICE AND RADIO COMMUNICATION DEVICE

(71) Applicant: NEC Corporation, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/420,560

(22) PCT Filed: Aug. 21, 2019

(86) PCT No.: PCT/JP2019/032677
§ 371 (c)(1),
(2) Date: Jul. 2, 2021

(87) PCT Pub. No.: WO2020/144889
PCT Pub. Date: Jul. 16, 2020

(65) Prior Publication Data
US 2021/0391879 A1    Dec. 16, 2021

(30) Foreign Application Priority Data
Jan. 11, 2019   (JP) .............................. JP2019-003196

(51) Int. Cl.
*H04B 1/04* (2006.01)

(52) U.S. Cl.
CPC ....... *H04B 1/04* (2013.01); *H04B 2001/0425* (2013.01)

(58) Field of Classification Search
CPC .... H03F 1/3247; H03F 1/0222; H03F 1/3241; H03F 2201/3233; H04B 17/21;
(Continued)

(56) References Cited

U.S. PATENT DOCUMENTS

| 8,666,336 B1* | 3/2014 | Dick ..................... H04B 17/11 375/296 |
| 2007/0248184 A1* | 10/2007 | Plevridis ............. H03C 3/0908 375/296 |

(Continued)

FOREIGN PATENT DOCUMENTS

| JP | 2004-179943 A | 6/2004 |
| JP | 2012010155 A | 1/2012 |

(Continued)

OTHER PUBLICATIONS

International Search Report for PCT Application No. PCT/JP2019/032677, dated Nov. 12, 2019.
(Continued)

*Primary Examiner* — David S Huang
(74) *Attorney, Agent, or Firm* — Sughrue Mion, PLLC

(57) ABSTRACT

A control unit (control device) (12) is configured to be connectable to radio units (11-1 to 11-N), respectively, and each path unit (13) includes path units (13-1 to 13-N) having a first input path (L1) and a second input path (L2). The first input path (L1) is a path on which a corresponding DPD unit (14) is provided and through which a transmission baseband signal compensated for the non-linear distortion is input to a corresponding radio unit (11). The second input path (L2) is a path through which a transmission calibration signal for calibrating a path and amplitude deviation between the radio units (11) is input to the corresponding radio unit (11) without passing through the DPD unit (14).

9 Claims, 12 Drawing Sheets

(58) Field of Classification Search
CPC ........... H04B 2001/0425; H04B 17/11; H04B 17/13; H04B 2001/0408; H04L 27/368
See application file for complete search history.

(56) References Cited

U.S. PATENT DOCUMENTS

2014/0254716 A1\* 9/2014 Zhou ................... H04B 1/0475
　　　　　　　　　　　　　　　　　　375/296
2017/0324161 A1\* 11/2017 Kareisto ................ H01Q 3/267
2019/0089434 A1 3/2019 Rainish et al.

FOREIGN PATENT DOCUMENTS

| JP | 2012-231270 A | 11/2012 |
|---|---|---|
| JP | 2017139711 A | 8/2017 |
| JP | 2018195955 A | 12/2018 |
| WO | 2017153985 A1 | 9/2017 |

OTHER PUBLICATIONS

Japanese Office Action for JP Application No. 2020-565572 dated Jun. 28, 2022 with English Translation.

\* cited by examiner

CONTROL DEVICE AND RADIO COMMUNICATION DEVICE

This application is a National Stage Entry of PCT/JP2019/032677 filed on Aug. 21, 2019, which claims priority from Japanese Patent Application 2019-003196 filed on Jan. 11, 2019, the contents of all of which are incorporated herein by reference, in their entirety.

TECHNICAL FIELD

The present disclosure relates to a control device and a radio communication device.

BACKGROUND ART

Adopting an active antenna system (AAS) for a base station is being considered. The AAS includes a plurality of (many) antenna elements, a plurality of independent transmitters and receivers corresponding to the plurality of antenna elements, and a control unit. Further, an AAS having a MU-MIMO (Multi User-Multi Input Multi Output) or Massive MIMO function is known. Using a digital beamforming (BF) function in the AAS, a spatial multiplexing signal to a wireless terminal (user device) group can be superimposed in a digital baseband region (DBB) in a form of multiple layers and can be transmitted to the wireless terminal (user device) group at once.

Performance of beamforming by the AAS is reduced by an amplitude and phase variation of the plurality of transmitters and receivers. Therefore, it is necessary to perform transmitter and receiver calibration (downlink (DL/uplink (UL) CAL (Calibration)) in order to compensate for the amplitude and phase variation. Further, since amplitude and phase characteristics of each of the transmitters and receivers of the AAS fluctuate due to fluctuations in outside air temperature and a lapse of time, it is important to periodically execute the transmitter and receiver calibration to enable compensation for such characteristic fluctuations.

In addition, there is a technique for compensating for a non-linear distortion component superimposed on the transmission radio signal due to the non-linear region of the amplifier. Such a technique includes, for example, a digital pre-distortion (DPD) method (for example, Patent Literature 1). The DPD processing is processing of compensating for the non-linear distortion by giving reverse characteristics of distortion characteristics of the amplifier to a signal of a stage before being input to the amplifier in advance to make the distortion component of the amplifier offsetting.

CITATION LIST

Patent Literature

Patent Literature 1: Japanese Unexamined Patent Application Publication No. 2017-139711

SUMMARY OF INVENTION

Technical Problem

The inventors have found that when the DPD method is simply applied to the radio communication device, the transmission calibration signal used for the transmission calibration may be affected by the DPD processing and the accuracy of the transmission calibration may be reduced.

An object of the present disclosure is to provide a control device and a radio communication device capable of preventing a decrease in accuracy of transmission calibration.

Solution to Problem

A control device according to a first aspect includes: a plurality of distortion compensation unit corresponding to a plurality of radio unit, each of the distortion compensation unit being configured to compensate for non-linear distortion with respect to a transmission baseband signal input to a corresponding radio unit using reverse characteristics of non-linear distortion characteristics in the corresponding radio unit; and a plurality of path unit connected to the plurality of radio unit, respectively, each of the path unit including a first input path and a second input path, wherein the first input path is a path on which the corresponding distortion compensation unit is provided and through which the transmission baseband signal compensated for the non-linear distortion is input to the corresponding radio unit, and the second input path is a path through which a calibration signal for calibrating a phase and amplitude deviation between the radio unit in the plurality of radio unit is input to the corresponding radio unit without passing through the distortion compensation unit.

A radio communication device according to a second aspect Includes: a plurality of antenna elements; a plurality of radio unit connected to the plurality of antenna elements, respectively; and a control device, the control device including: a plurality of distortion compensation unit corresponding to a plurality of radio unit, each of the distortion compensation unit being configured to compensate for non-linear distortion with respect to a transmission baseband signal input to a corresponding radio unit using reverse characteristics of non-linear distortion characteristics in the corresponding radio unit; and a plurality of path unit connected to the plurality of radio unit, respectively, each of the path unit including a first input path and a second input path, wherein the first input path is a path on which the corresponding distortion compensation unit is provided and through which the transmission baseband signal compensated for the non-linear distortion is input to the corresponding radio unit, and the second input path is a path through which a calibration signal for calibrating a phase and amplitude deviation between the radio unit in the plurality of radio unit is input to the corresponding radio unit without passing through the distortion compensation unit.

Advantageous Effects of Invention

According to the present disclosure, it is possible to provide a control device and a radio communication device capable of preventing a decrease in accuracy of transmission calibration.

DESCRIPTION OF EMBODIMENTS

Figure 1:
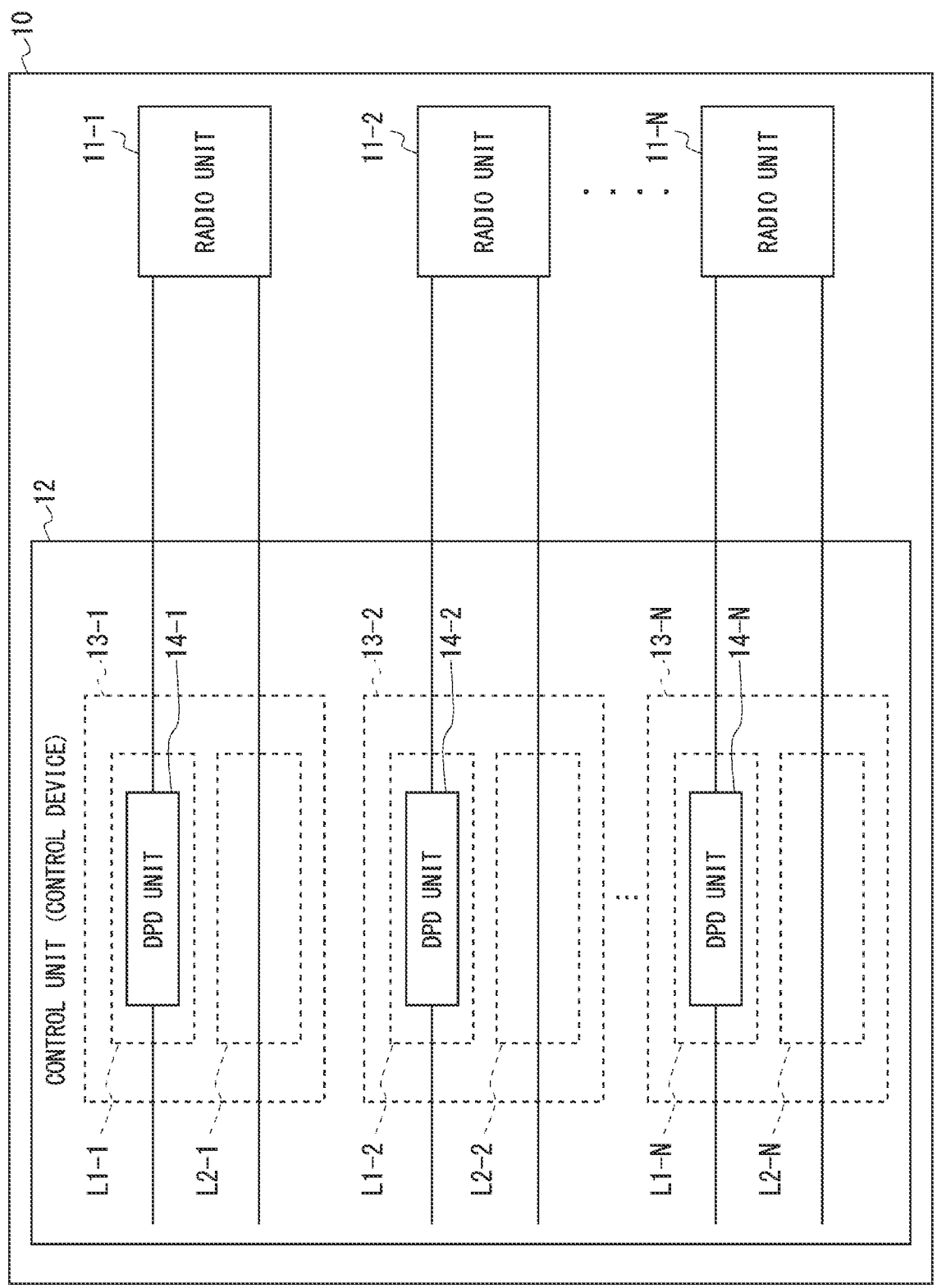
FIG. 1 is a block diagram showing an example of a radio communication device of a first example embodiment.

Example embodiments will be described below with reference to the drawings. In the example embodiments, same or equivalent components are denoted by same reference numerals, and will not be described repeatedly.

First Example Embodiment

FIG. 1 is a block diagram showing an example of a radio communication device of a first example embodiment. A radio communication device 10 shown in FIG. 1 may be, for example, an AAS including a plurality of antenna elements and a plurality of transmitters and receivers connected to the plurality of antenna elements, respectively, the AAS being included in a base station. In the following, as an example, the radio communication device 10 will be described as being an AAS included in the base station. In other words, a communication partner of the radio communication device 10 is one or a plurality of user devices (not shown). In FIG. 1, the radio communication device 10 includes radio units 11-1 to 11-N (N being a natural number of 2 or more) and a control unit (control device) 12. The radio units 11-1 to 11-N may be collectively referred to as a radio unit 11.

The radio units 11-1 to 11-N correspond to the plurality of antenna elements (not shown), respectively, and are connected to the plurality of antenna elements (not shown), respectively.

The control unit (control device) 12 includes path units 13-1 to 13-N. The path units 13-1 to 13-N are connected to the radio units 11-1 to 11-N, respectively. Each of the path units 13-1 to 13-N is a signal path through which a signal is input to each of the radio units 11-1 to 11-N. each of the path units 13-1 to 13-N includes each of digital pre-distortion (DPD) units (distortion compensation units) 14-1 to 14-N. In the following, the path units 13-1 to 13-N may be collectively referred to as a path unit 13. In addition, the DPD units 14-1 to 14-N may be collectively referred to as a DPD unit 14.

Each of the DPD units 14 compensates for non-linear distortion with respect to a transmission baseband signal input to the corresponding radio unit 11, using reverse characteristics of non-linear distortion characteristics (hereinafter, simply referred to as "distortion characteristics") in the corresponding radio unit 11.

The path unit 13 includes a first input path L1 and a second input path L2. For example, the path unit 13-1 includes a first input path L1-1 and a second input path L2-1. The first input path L1 includes the corresponding DPD unit 14, while the second input path L2 does not include the DPD unit 14. In other words, in the first example embodiment, the first input path L1 is a signal path on which a corresponding DPD unit 14 is provided and through which the transmission baseband signal compensated for the non-linear distortion is input to the corresponding radio unit 11. On the other hand, the second input path L2 is a signal path through which a transmission calibration signal (DL CAL signal) for calibrating a deviation in path and amplitude between the radio units 11 of the radio units 11-1 to 11-N is input to the corresponding radio unit 11 without passing through the DPD unit 14.

According to the first example embodiment as described above, the control unit (control device) 12 includes the path units 13-1 to 13-N configured to be connectable to the radio units 11-1 to 11-N, respectively, and each of the path units 13 includes the first input path L1 and the second input path L2. The first input path L1 is a path on which the corresponding DPD unit 14 is provided and through which the transmission baseband signal compensated for the non-linear distortion is input to the corresponding radio unit 11. The second input path L2 is a path through which the transmission calibration signal for calibrating the deviation in path and amplitude between the radio units 11 is input to the corresponding radio unit 11 without passing through the DPD unit 14.

With the configuration of the control unit (control device) 12, it is possible to prevent degradation of accuracy in the transmission calibration. In other words, the transmission calibration signal is amplified in a linear region of an amplifier (not shown) included in the radio unit 11 as a premise. Therefore, when the transmission calibration signal is subjected to distortion compensation processing using the reverse characteristics of the distortion characteristics, the accuracy of the transmission calibration may be degraded due to the influence of the distortion compensation processing. On the other hand, according to the control unit (control device) 12 of the first example embodiment, since the transmission calibration signal is not subjected to the distortion compensation processing, the degradation of the accuracy in the transmission calibration can be prevented. Further, since the decrease in accuracy of the transmission calibration is prevented, degradation of beamforming characteristics can also be prevented when the radio communication device 10 executes beamforming transmission.

Second Example Embodiment

In a second example embodiment, a radio communication device will be described in more detailed.

<Configuration Example of Radio Communication Device>

Figure 2:
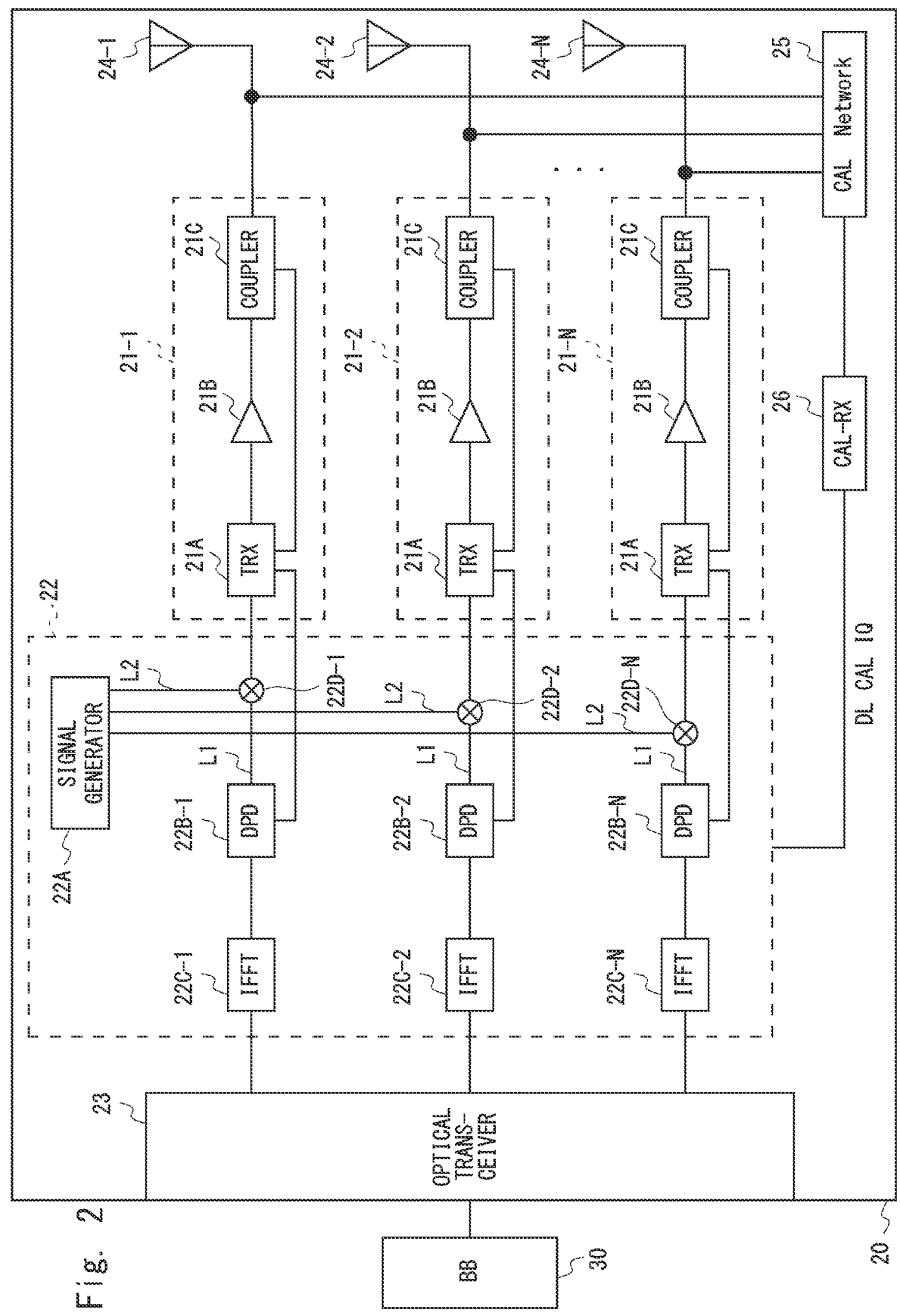
FIG. 2 is a block diagram showing an example of a radio communication device of a second example embodiment.

FIG. 2 is a block diagram showing an example of the radio communication device of the second example embodiment. FIG. 2 shows a configuration example of a base station, and the base station is indicated by a radio communication device 20 and a baseband device 30 having a beamforming function. Similarly to the radio communication device 10 of the first example embodiment, the radio communication device 20 corresponds to an AAS.

The baseband device 30 generates a transmission baseband signal. For example, the baseband device 30 has a function of generating a beamforming signal. In other words, the baseband device 30 has a function of generating a plurality of layer signals. The baseband device 30 generates a composite signal (plurality of layer signals) on which a transmission signal transmitted to n users (n terminals) is superimposed, and transmits the composite signal to the radio communication device 20. At this time, the baseband device 30 adds a signal delay of a phase deviation amount to the layer signals directed to the respective users based on a beamforming weight to generate the plurality of layer signals. The transmission baseband signal generated by the baseband device 30 is transformed into, for example, an optical signal, and the optical signal is transmitted to the radio communication device 20.

In FIG. 2, the radio communication device 20 includes radio units 21-1 to 21-N, a control unit (control device) 22, an optical transceiver 23, antenna elements 24-1 to 24-N, a CAL Network circuit unit 25, and a calibration signal receiving unit (CAL-RX) 26. In the following description, when not being distinguished from each other, the radio units 21-1 to 21-N may be collectively referred as a radio unit 21. In addition, when not being distinguished from each other, the antenna element 24-1 to 24-N may be collectively referred as an antenna element 24.

The optical transceiver 23 performs photoelectric transformation and its inverse transformation of the transmission baseband signal transmitted and received between the baseband device 30 and the control unit 22.

The control unit 22 executes digital baseband processing such as digital pre-distortion (DPD) processing on the transmission baseband signal received via the optical transceiver 23. In other words, the control unit 22 is a digital baseband processing unit in the AAS. The transmission baseband signal subjected to the digital baseband processing by the control unit 22 is output to each of the radio units 21. Further, the control unit 22 generates a transmission calibration signal, and outputs it to each of the radio units 21. Here, as will be described below, since calibration processing is performed within a guard period (GP) in which neither uplink transmission nor downlink transmission is performed, the transmission baseband signal and the transmission calibration signal are not input to the radio unit 21 simultaneously.

For example, the control unit 22 includes a signal generator 22A, DPD units 22B-1 to 22B-N, an IFFT (inverse fast Fourier transform) units 22C-1 to 22C-N, and multipliers 22D-1 to 22D-N. In the following description, when not being distinguished from each other, the DPD units 22B-1 to 22B-N, the IFFT units 22C-1 to 22C-N, and the multiplier 22D-1 to 22D-N may be referred as a DPD unit 22B, an IFFT unit 22C, and a multiplier 22D, respectively. The IFFT unit 22C, the DPD unit 22B, the radio unit 21, and the antenna element 24, which are connected to each other, form one transmission system. In other words, the radio communication device 20 includes N transmission systems. These transmission systems has basically the same configuration.

The IFFT unit 22C performs IFFT processing on the transmission baseband signal which is a frequency domain signal, and transforms the transmission baseband signal into a time domain signal. In other words, as a premise, subcarrier transmission such as an OFDM (Orthogonal Frequency Division Multiplexing) is performed between the radio communication device 20 and the user device (not shown).

The DPD unit 22B calculates non-linear distortion characteristics of the radio unit 21 based on a feedback signal transmitted from the radio unit 21. Then, the DPD unit 22B performs distortion compensation processing on the transmission baseband signal received from the IFFT unit 22C, using reverse characteristics of the calculated non-linear distortion characteristic. The transmission baseband signal subjected to the distortion compensation processing is input to the radio unit 21 via the multiplier 22D.

The signal generator 22A generates a transmission calibration signal (DL calibration signal, DL CAL IQ), and outputs the generated transmission calibration signal toward the radio unit 21. The output transmission calibration signal is output to the radio unit 21 via the multiplier 22D. Here, the signal generator 22A may shift an output timing of the plurality of transmission calibration signals to be output toward the radio units 21-1 to 21-N such that the transmission calibration signals having passed through the respective radio units 21-1 to 21-N can be separated from each other.

Further, the signal generator 22A outputs the transmission calibration signal having an amplitude level corresponding to a linear region included in an amplifier 21B (to be described below) of the radio unit 21 to the radio unit 21. In other words, a peak amplitude level (that is, an effective (RMS) value +a peak to average power ratio (PAPR)) of the transmission calibration signal to be output from the signal generator 22A is equal to or lower than a maximum level, at which linearity of the transmission calibration signal can be ensured, without reaching the non-linear region of the radio unit 21. Thus, the transmission calibration signal is not affected by a non-linear distortion generated in the non-linear region of the amplifier 21B (to be described below), thereby the accuracy of the transmission calibration can be improved.

In the radio communication device 20 of the second example embodiment, since the transmission calibration signal is input to the second input path L2 on an output stage of the IFFT unit 22C, the transmission calibration signal may be a time domain signal.

The multiplier 22D outputs the transmission baseband signal received from the DPD unit 22B and the transmission calibration signal received from the signal generator 22A to the radio unit 21. In other words, in the radio communication device 20 of the second example embodiment, a path between the DPD unit 22B and the radio unit 21 via the multiplier 22D corresponds to the first input path L1 described above, while a path between the signal generator 22A and the radio unit 21 via the multiplier 22D corresponds to the second input path L2 described above. Here, the first input path L1 and the second input path L2 of the second example embodiment share a part of the path (that is, a part between the multiplier 22D and the radio unit 21), but since the calibration processing is performed within the guard period (GP) as will be described below, the transmission baseband signal and the transmission calibration signal are not input to the radio unit 21 simultaneously. Further, as in the first example embodiment, since the transmission calibration signal can be input to the radio unit 21 through the second input path L2 through which the transmission calibration signal is input to the radio unit 21 without passing through the DPD unit 22B, the accuracy of the transmission calibration can be prevented from being reduced. Further, the beamforming characteristics can be prevented from being reduced. In the second example embodiment, the DPD unit 22B and the IFFT unit 22C are arranged on the first input path L1.

The radio unit 21 performs predetermined transmission radio processing on the transmission baseband signal received from the control unit 22 to obtain a transmission radio signal, transmits the obtained transmission radio signal via the antenna element 24, and generates a feedback signal to the DPD unit 22B using some of the transmission radio signal. In addition, the radio unit 21 performs predetermined transmission radio processing on the transmission calibration signal received from the control unit 22 to obtain a calibration radio signal, and output the obtained calibration radio signal to a transmission calibration feedback system (hereinafter, simply referred to as a "feedback system"). The feedback system includes the CAL Network circuit unit 25 and the CAL-RX 26.

For example, the radio unit 21 includes a transmission/reception radio processing unit (TRX) 21A, an amplifier 21B, and a coupler (directional coupler) 21C. The TRX 21A and the amplifier 21B corresponding to each other form one transmission system. Although not shown, the radio unit 21 includes a reception system that connects the coupler 21C, the reception amplifier (not shown), and the TRX 21A. With such a reception system, the uplink signal transmitted from the user device (not shown) can be received. Further, although not described in detail herein, the reception system is subjected to reception calibration.

The TRX 21A performs transmission radio processing and reception radio processing. In other words, the TRX 21A performs transmission radio processing (for example, digital-to-analog conversion or up-converting) on the transmission baseband signal received from the control unit 22 to obtain a transmission radio signal, and outputs the obtained transmission radio signal to the amplifier 21B. Then, the TRX 21A receives some of the transmission radio signal amplified by the amplifier 21B via the coupler 21C, performs reception radio processing (for example, down-converting or analog-to-digital conversion) on the received radio signal to obtain a baseband signal, and outputs the obtained baseband signal to the DPD 22B as a feedback signal. As described above, the feedback signal is used for calculation of the non-linear distortion characteristics of the radio unit 21.

In addition, the TRX 21A performs transmission radio processing (for example, digital-to-analog conversion or up-converting) on the transmission calibration signal received from the control unit 22 to obtain a calibration radio signal, and outputs the obtained calibration radio signal to the amplifier 21B. The calibration radio signal will be output to the transmission calibration feedback system described above.

The amplifier 21B amplifies the radio signal received from the TRX 21A, and outputs the radio signal amplified to the coupler 21C.

The coupler (directional coupler) 21C outputs some of the radio signal received from the amplifier 21B to the TRX 21A, and outputs the remaining radio signal to the antenna element 24 and the transmission calibration feedback system.

The CAL-RX 26 receives the calibration radio signal via the CAL Network circuit unit 25 having a combiner function, performs reception radio processing (for example, down-converting or analog-to-digital conversion) on the received calibration radio signal to obtain a calibration signal (IQ signal, DL CAL IQ), and outputs the obtained calibration signal to the control unit 22. Up receiving the calibration signal, the control unit 22 calculates a calibration weight to be applied to the radio unit 21, and applies the calculated calibration weight to the radio unit 21. The calibration weight is a weight for compensating for variations in the amplitude and the phase of the transmission system of the radio unit 21.

Here, the amplitude frequency characteristics of the transmission system of the radio unit 21 include a difference in frequency characteristics of the respective transmission systems remaining after frequency characteristic compensation by the DPD unit 22B and a difference in amplitude phase frequency characteristics between the respective transmission system due to a bandpass filter (not shown) between the coupler 21C and the antenna element 24. In addition, the phase frequency characteristics of the transmission system of the radio unit 21 include a phase gradient due to a delay difference of the respective transmission systems and an initial phase deviation at the time of AAS activation of a local oscillator (not shown).

<Execution Timing of Transmission Calibration>

Next, an execution timing of the transmission calibration processing (DL calibration processing) will be described.

As a premise, the radio communication device 20 is a radio communication device corresponding to a TDD mode (TDD communication mode). The TDD mode is a communication mode in which DL communication and UL communication are switched in time to perform transmission and reception using the same frequency in up and down links (UL/DL). The DL communication is performed in a DL subframe, and the UL communication is performed in an UL subframe. Further, the switching from the DL communication to the UL communication is performed in a special subframe. The special subframe is a subframe including a DwPTS (Downlink Pilot Time Slot), a GP (Guard Period), and an UpPTS (Uplink Pilot Time Slot). The DwPTS is a period prepared for the DL communication. The UpPTS is a period prepared for the UL communication. The GP is a period at which neither DL communication nor UL communication is performed.

Figure 3:
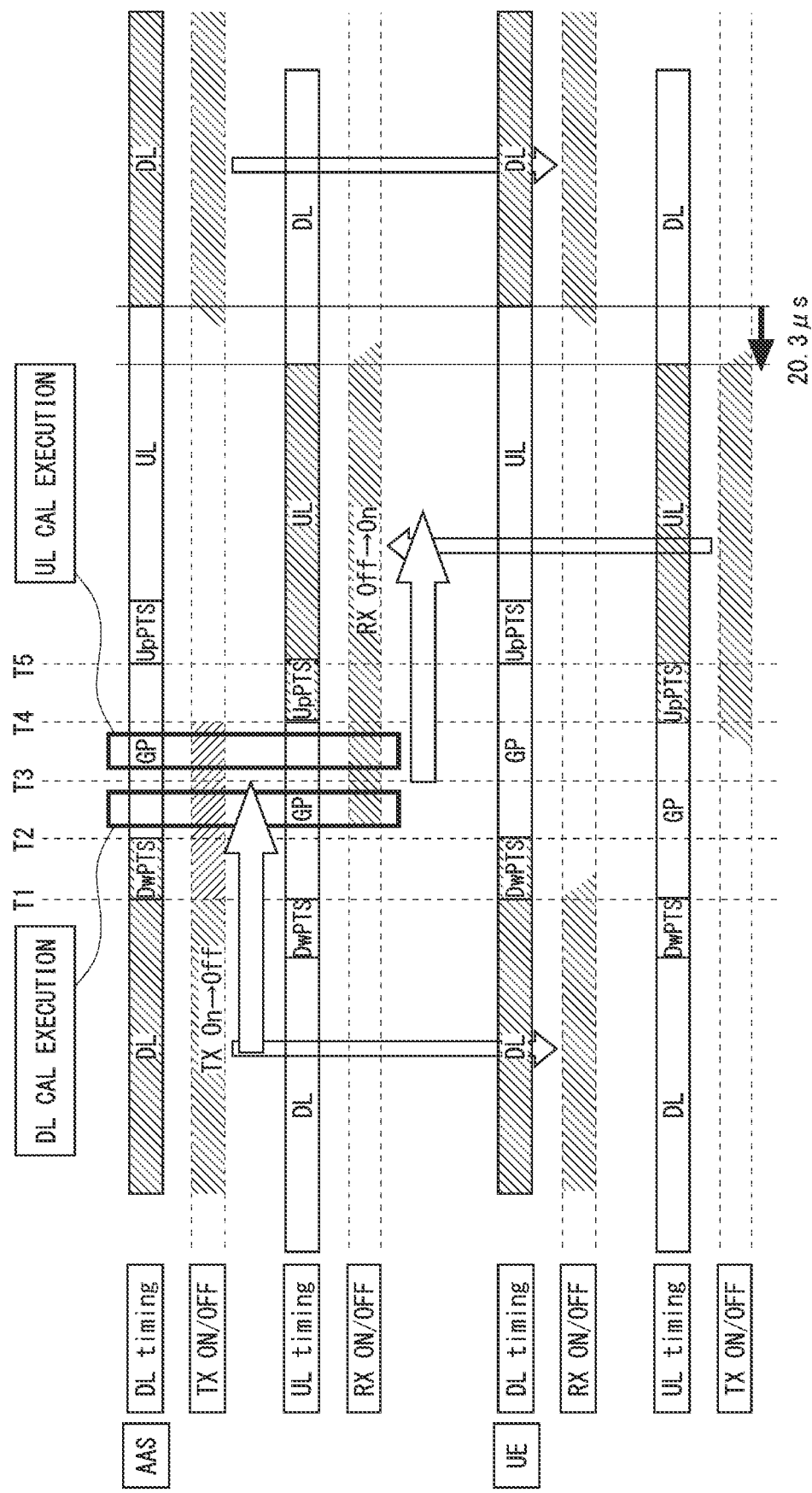
FIG. 3 is a graph illustrating execution timing of transmission calibration.

FIG. 3 shows, from the top, times (T1 to T5), DL timing of the radio communication device 20, a status of ON or OFF of a transmitter TX of the radio communication device 20 (corresponding to the transmission system of the radio unit 21), UL timing, and a status of ON or OFF of a receiver RX of the radio communication device 20 (corresponding to the reception system of the radio unit 21). Further, FIG. 3 shows DL timing of a UE (User Equipment=terminal) communicating with the radio communication device 20, a status of ON or OFF of a receiver RX of the UE, UL timing, and a status of ON or OFF of a transmitter TX of the UE. The time T5 indicates the latest time when the time has sequentially elapsed from the time T1. Each of the DL timing and the UL timing indicates a time interval of the DL communication, the DwPTS, the GP, the UpPTS and the UL communication. The time interval hatched by a diagonal line in the DL timing and the UL timing indicates is a time interval assigned to the DL or the UL.

As shown in the DL timing of the radio communication device 20 in FIG. 3, the transmitter TX of the radio communication device 20 is controlled to switch from an ON state to an OFF state at time T3. Further, as shown in the UL timing in FIG. 3, the receiver RX of the radio communication device 20 is controlled to switch from the OFF state to the ON state at time T3.

Here, between time T2 to time T4, both of the DL timing and the UL timing are a time interval of GP, the transmitter TX is in the OFF state at time T3, and the receiver RX is in the ON state at time T3. The radio communication device 20 executes DL calibration within 20.3 usec which is a time interval of GP of the special subframe (strictly, s frame timing difference between the uplink and the downlink (Uplink-downlink frame timing) from the GP, and then executes UL calibration.

<Power Level of Transmitter at time of Execution of Transmission Calibration>

Figure 4:
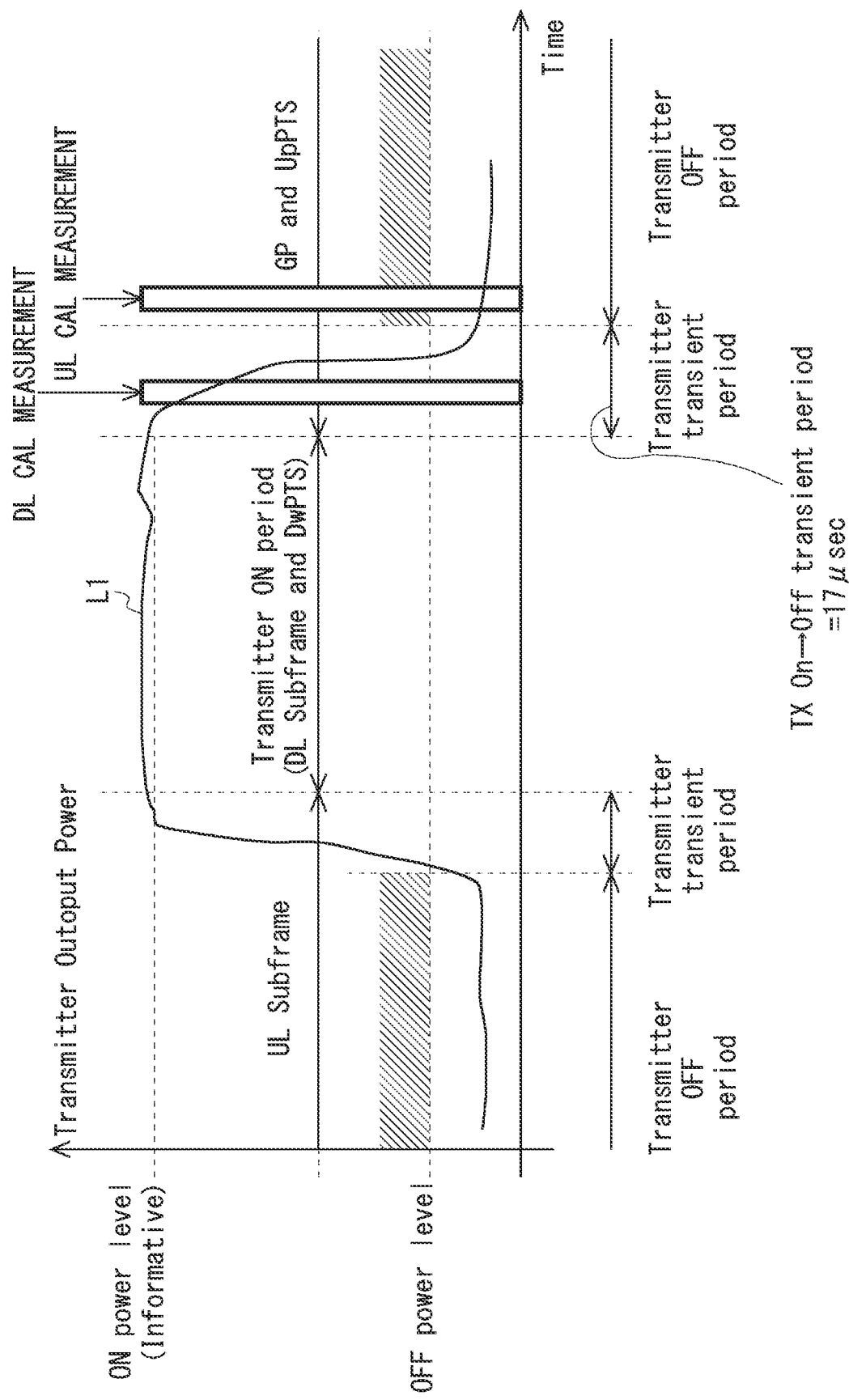
FIG. 4 is a graph illustrating a power level of a transmitter in the transmission calibration.

A power level of the transmitter TX in the DL calibration of the radio communication device 20 will be described below with reference to FIG. 4. FIG. 4 is a graph illustrating the power level of the transmitter in the DL calibration. FIG. 4 shows the power level of the transmitter TX at each timing of the DL timing and the UL timing. In FIG. 4, a horizontal axis indicates a time, and a vertical axis indicates a power level. A solid line L1 in FIG. 4 indicates a transition of a transmission power level of the transmitter TX of the radio communication device 20. The graph of FIG. 4 shows each timing of DL timing and UL timing, a time interval described as a UL subframe indicates that UL communication is performed. Further, a time interval described as DL subframe and DwPTS indicates a time interval of DL communication and DwPTS. In addition, a time interval described as GP and UpPTS indicates a time interval of GP and UpPTS.

As shown in FIG. 4, a time interval during which the transmitter TX transitions from the ON state to the OFF state in the GP is defined as 17 μsec in a 3 GPP standard (TS36. 104). For this reason, as shown in FIGS. 3 and 4, the radio communication device 20 executes DL calibration in 17 μsec during which the transmitter TX transitions from the ON state to the OFF state.

Next, the radio communication device 20 executes UL calibration in a state where the transmitter TX completely transitions to the OFF state (after the 17 μsec has elapsed). Strictly, the radio communication device 20 executes UL calibration in the interval excluding the 17 μsec from the "GP subinterval" described above. Here, according to the 3 GPP standard (TS36. 104), when the transmitter TX is in the OFF state, it is necessary to make it −85 dBm/MHz or less. In other words, the radio communication device 20 needs to perform UL calibration while maintaining −85 dBm/MHz or less. When executing the UL calibration, the radio communication device 20 transmits a UL calibration signal, which is a signal for UL calibration, to its own device and executes it. However, when a signal level of the UL calibration signal is high, the UL calibration signal may leak from the antenna (ANT), so that the radio communication device 20 sets the signal level of the UL calibration signal to be lower.

As described above, according to the second example embodiment, the signal generator 22A in the control unit (control device) 12 outputs the transmission calibration signal having the amplitude level corresponding to the linear region included in the amplifier 21B of the radio unit 21 to the radio unit 21.

With the configuration of the control unit (control device) 12, since the transmission calibration signal (DL calibration signal) is not affected by the non-linear distortion generated in the non-linear region of the amplifier 21B, the accuracy of the transmission calibration can be improved.

Third Example Embodiment

Figure 5:
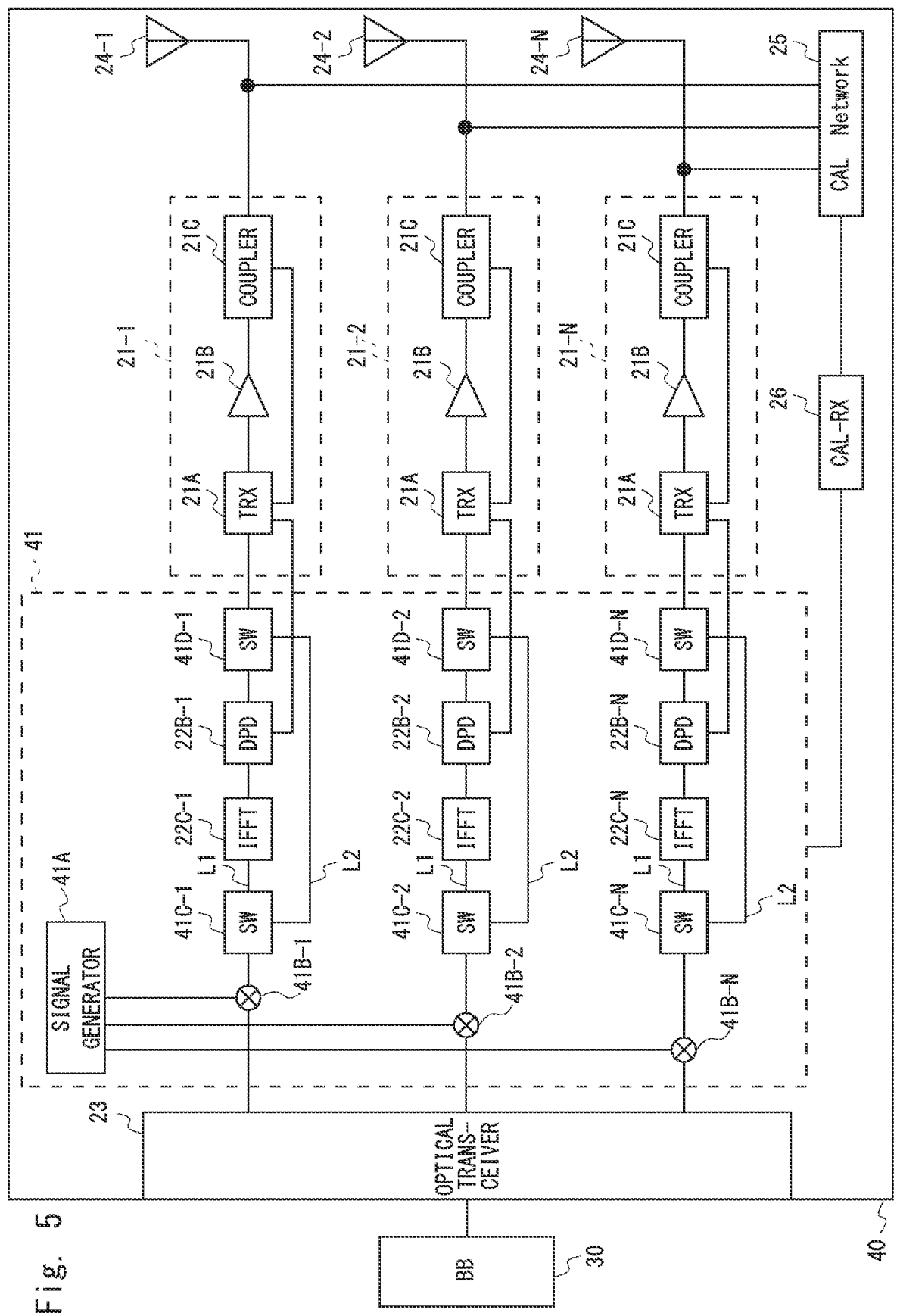
FIG. 5 is a block diagram showing an example of a radio communication device of a third example embodiment.

A third example embodiment relates to variations in a configuration of a radio communication device.
<Configuration Example of Radio Communication Device>
FIG. 5 is a block diagram showing an example of a radio communication device of the third example embodiment. The radio communication device 40 of the third example embodiment differs mainly from the radio communication device 20 of the second example embodiment in that the transmission calibration signal is input from an input stage side of the IFFT unit 22C to the second input path L2 and two switches (for switching to the DPD Bypass path and the second input path L2) are provided on the input stage side of the IFFT unit 22C and an output stage side of the DPD unit 22B.

In FIG. 5, the radio communication device 40 includes a control unit (control device) 41. The control unit 41 includes a signal generator 41A, multipliers 41B-1 to 41B-N, switches (SWs) 41C-1 to 41C-N, and switches 41D-1 to 41D-N. in the following description, when not being distinguished from each other, the multipliers 41B-1 to 41B-N may be collectively referred to as a multiplier 41B. Further, when not being distinguished from each other, the switches 41C-1 to 41C-N may be collectively referred to as a switch 41C. In addition, when not being distinguished from each other, the switches 41D-1 to 41D-N may be collectively referred to as a switch 41D.

The multiplier 41B outputs a transmission calibration signal received from the signal generator 41A to the SW 41C. Further, the multiplier 41B outputs a transmission baseband signal received from the optical transceiver 23 to the SW 41C.

The SW 41C switches a connection target with the multiplier 41B (that is, a connection target with a signal input point of a path unit of the third example embodiment) between a first input path L1 and a second input path L2, according to the amplitude level of the input signal. Specifically, when the amplitude level of the input signal is equal to or larger than a "first threshold value", the SW 41C switches the connection target with the multiplier 41B to the first input path L1. On the other hand, when the amplitude level of the input signal is smaller than the "first threshold value", the SW 41C switches the connection target with the multiplier 41B to the second input path L2. Here, the "first threshold value" corresponds to the amplitude level of the transmission baseband signal when a difference between EVM (Error Vector Magnitude (being synonymous with Downlink (DL) SINR)) characteristics with respect to an output signal of the radio unit 21 when the transmission baseband signal has passed through the first input path L1 and the radio unit 21 and EVM characteristics with respect to an output signal of the radio unit 21 when the transmission baseband signal has passed through the second input path L2 and the radio unit 21 is within a predetermined ranged. Meanings that the difference is within the predetermined range represent that the EVM characteristics with respect to the output signal of the radio unit 21 does not change regardless of whether the transmission baseband signal passes through either of the first input path L1 and the second input path L2. The first threshold value may be specified by pre-shipment characteristic verification of the radio communication device 20 and may be set before shipment. Instead of the EVM characteristics described above, adjacent channel leakage power ratio (ACLR) characteristics may be used.

The SW 41D switches a connection target with the radio unit 21 between the first input path L1 and the second input path L2, in conjunction with the SW 41C. In other words, similarly to the SW 41C, the SW 41D also switches the connection target with the radio unit 21 to the first input path L1 when the amplitude level of the input signal to the SW 41C is equal to or larger than the "first threshold value". On the other hand, when the amplitude level of the input signal to the SW 41C is smaller than the "first threshold value", the SW 41D switches the connection target with the radio unit 21 to the second input path L2.

The signal generator 41A outputs, via the multiplier 41B, a transmission calibration signal having an amplitude level smaller than the first threshold value to the SW 41C. Thus, since the transmission calibration signal passes through the second input path L2, the accuracy of the transmission calibration can be prevented from being reduced as in the first and second example embodiments.

In the radio communication device 40 of the third example embodiment, since the transmission calibration signal is input to the second input path L2 via the SW 41C at the input stage of the IFFT unit 22C, the transmission calibration signal may be a frequency domain signal. In particular, since the signal generator 41A outputs the transmission calibration signal for each of subcarrier regions of an OFDM, the transmission calibration signal subjected to processing by the CAL-RX 26 returns to the subcarrier regions again by an FFT analysis unit (not shown), and then amplitude and phase characteristics can be specified in frequency bin units. Thereby, the accuracy of specifying the amplitude and phase characteristics in the transmission calibration processing is improved, so that the accuracy of the transmission calibration can be improved.

Fourth Example Embodiment

A fourth example embodiment relates to a method of deriving the "first threshold value" described in the third example embodiment, that is, a "switching threshold value" for switching between the SW 41C and the SW 41D. In the fourth example embodiment, a method of deriving the "switching threshold value" based on an in-band EVM (Error Vector Magnitude (being synonymous with Downlink (DL) SINR)) will be described.

Figure 6:
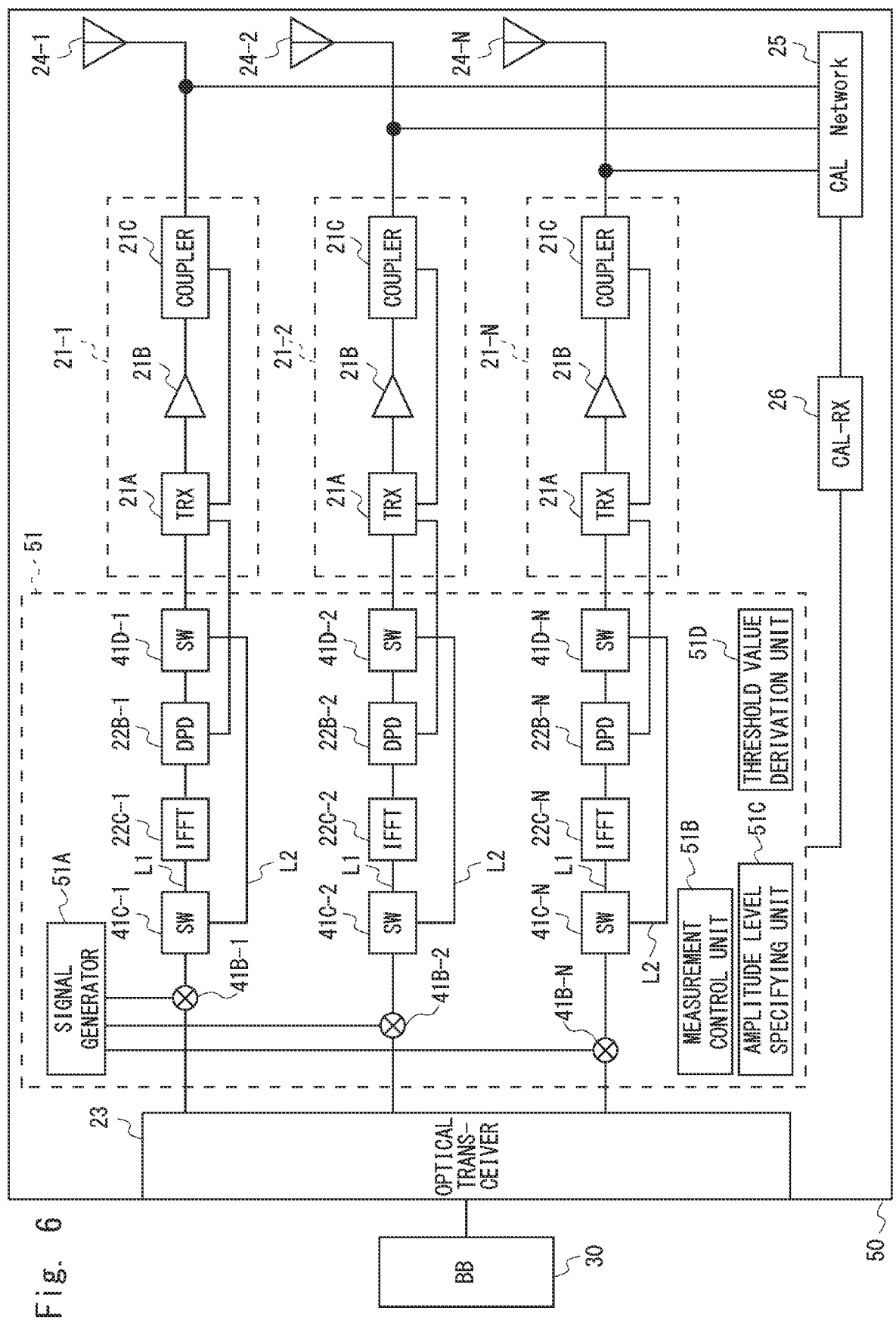
FIG. 6 is a block diagram showing an example of a radio communication device of a fourth example embodiment.

FIG. 6 is a block diagram showing an example of a radio communication device of the fourth example embodiment. In FIG. 6, a radio communication device 50 includes a control unit (control device) 51. The control unit (control device) 51 includes a signal generator 51A, a measurement control unit 51B, an amplitude level specifying unit 51C, and a threshold value derivation unit 51D.

The measurement control unit 51B causes the signal generator 51A to ramp up an amplitude level of a "measurement signal" toward maximum rating (that is, to increase the amplitude level stepwise) and to output sequentially the measurement signal. At this time, the measurement control unit 51B switches a connection destination of the SW 41C and the SW 41D between the first input path L1 and the second input path L2 while the measurement signal of each amplitude level is input to the path unit (that is, SW 41C). Thus, a signal corresponding to the measurement signal of each amplitude level having passed through a radio unit 21, a CAL Network circuit unit 25, and a CAL-RX after having passed through the first input path L1 or the second input path L2 is input to the control unit 51.

Here, as a period during which the measurement signal is output from the signal generator 51A, the "GP subinterval" can be used as in the transmission calibration signal described in the second example embodiment. However, an output frame of the transmission calibration signal is different in time from an output frame of the measurement signal.

The signal generator 51A outputs the "measurement signal" to the SW 41C via a multiplier 41B under control of the measurement control unit 51B. The signal generator 51A outputs a transmission calibration signal having an amplitude level smaller than the first threshold value to the SW 41C via the multiplier 41B. Although the description is given with respect to the case where the signal generator 51A outputs both of the measurement signal and the transmission calibration signal, a function unit for outputting the measurement signal may be provided independently of a function unit for outputting the transmission calibration signal.

Figure 7:
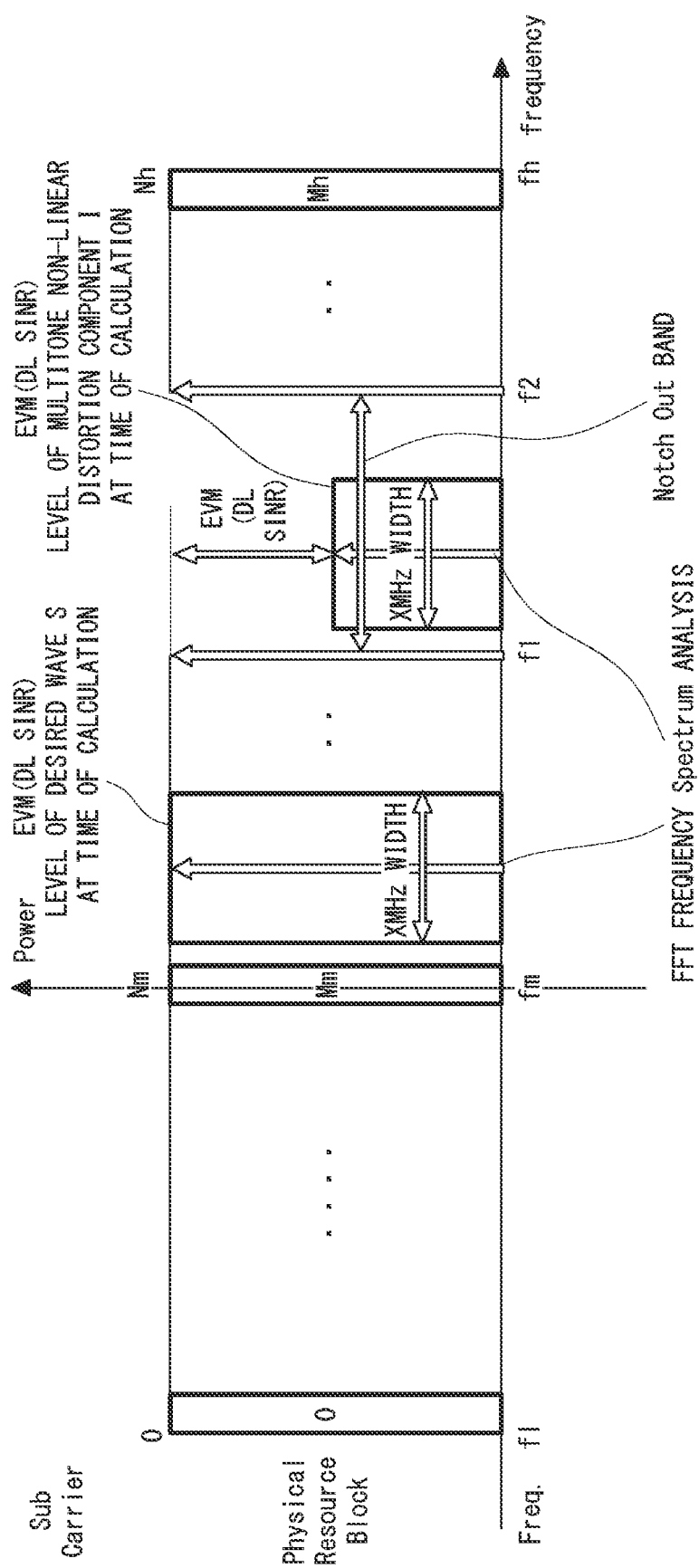
FIG. 7 is a graph illustrating a measurement signal of the fourth example embodiment.

Here, the "measurement signal" of the fourth example embodiment will be described. FIG. 7 is a graph illustrating the measurement signal of the fourth example embodiment. In the fourth example embodiment, a test signal for NPR (Noise Power Ratio) measurement effective for OFDM multitone distortion analysis is used as the "measurement signal". As shown in FIG. 7, the measurement signal of the fourth example embodiment is a multitone signal including a "notch out band". In other words, a notch out band is formed by a stop of some subcarriers out of a plurality of subcarriers (that is, transmission bandwidth) used for OFDM, and thus the measurement signal of the fourth example embodiment can be generated.

Figure 8:
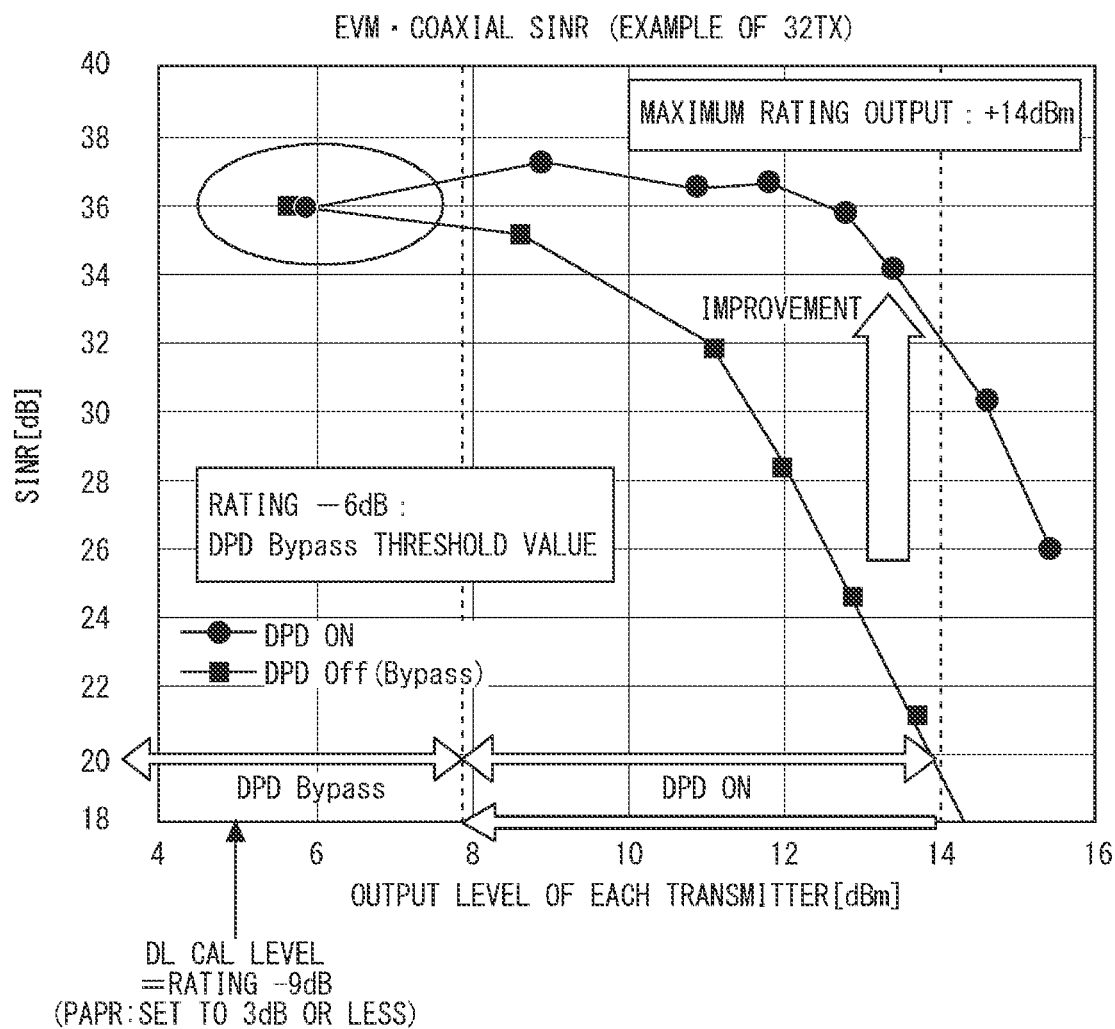
FIG. 8 is a graph illustrating a method of specifying an amplitude level of the measurement signal in the fourth example embodiment.

The amplitude level specifying unit 51C performs an FFT on a signal corresponding to the measurement signal having passed through the first input path L1 at each amplitude level of the measurement signal and a signal corresponding to the measurement signal having passed through the second input path L2, and thus converting the respective signals into frequency domain signals. Then, the amplitude level specifying unit 51C detects both a level of a non-linear distortion component appearing in the notch out band and a level of the multitone portion in the obtained frequency domain signal, and calculates a difference between the detected both levels as an in-band EVM. Then, the amplitude level specifying unit 51C specifies an amplitude level of the measurement signal at which the difference between the in-band EVM corresponding to the measurement signal having passed through the first input path L1 and the in-band EVM corresponding to the measurement signal having passed through the second input path L2 is equal to or less than a "second threshold value" (see FIG. 8). In other words, the amplitude level specifying unit 51C performs frequency spectrum analysis to specify the amplitude level of the measurement signal at which the above-described difference between the in-bands EVM is equal to or less than the second threshold value. When the difference between the in-bands EVM calculated in this way is equal to or less than the "second threshold value", it can be considered that there is no difference between the in-band EVM of the measurement signal having passed through the first input path L1 and the in-band EVM of the measurement signal having passed through the second input path L2. FIG. 8 is a graph illustrating a method of specifying the amplitude level of the measurement signal in the fourth example embodiment.

The threshold value derivation unit 51D derives, based on the amplitude level of the measurement signal specified by the amplitude level specifying unit 51C, the "first threshold value (that is, the switching threshold value of the SW 41C and the SW 41D)" described in the third example embodiment, and set the derived "first threshold value" in the SW 41C and the SW 41D. The threshold value derivation unit 51D may derive, as the "first threshold value", the amplitude level of the measurement signal specified by the amplitude level specifying unit 51C without change, or may derive the "first threshold value" using the amplitude level of the measurement signal specified by the amplitude level specifying unit 51C and a predetermined derivation formula.

Fifth Example Embodiment

In a fifth example embodiment, an adjacent channel leakage power ratio (ACLR) is used instead of the in-band EVM of the fourth example embodiment. A basic configuration of a radio communication device of the fifth example embodiment is similar to the basic configuration of the radio communication device 50 of the fourth example embodiment, and thus will be described with reference to FIG. 6. Differences between the radio communication device of the fifth example embodiment and the radio communication device of fourth example embodiment will mainly be described below.

A signal generator 51A of the fifth example embodiment outputs a "measurement signal" to the SW 41C via the multiplier 41B under control of the measurement control unit 51B.

Figure 9:
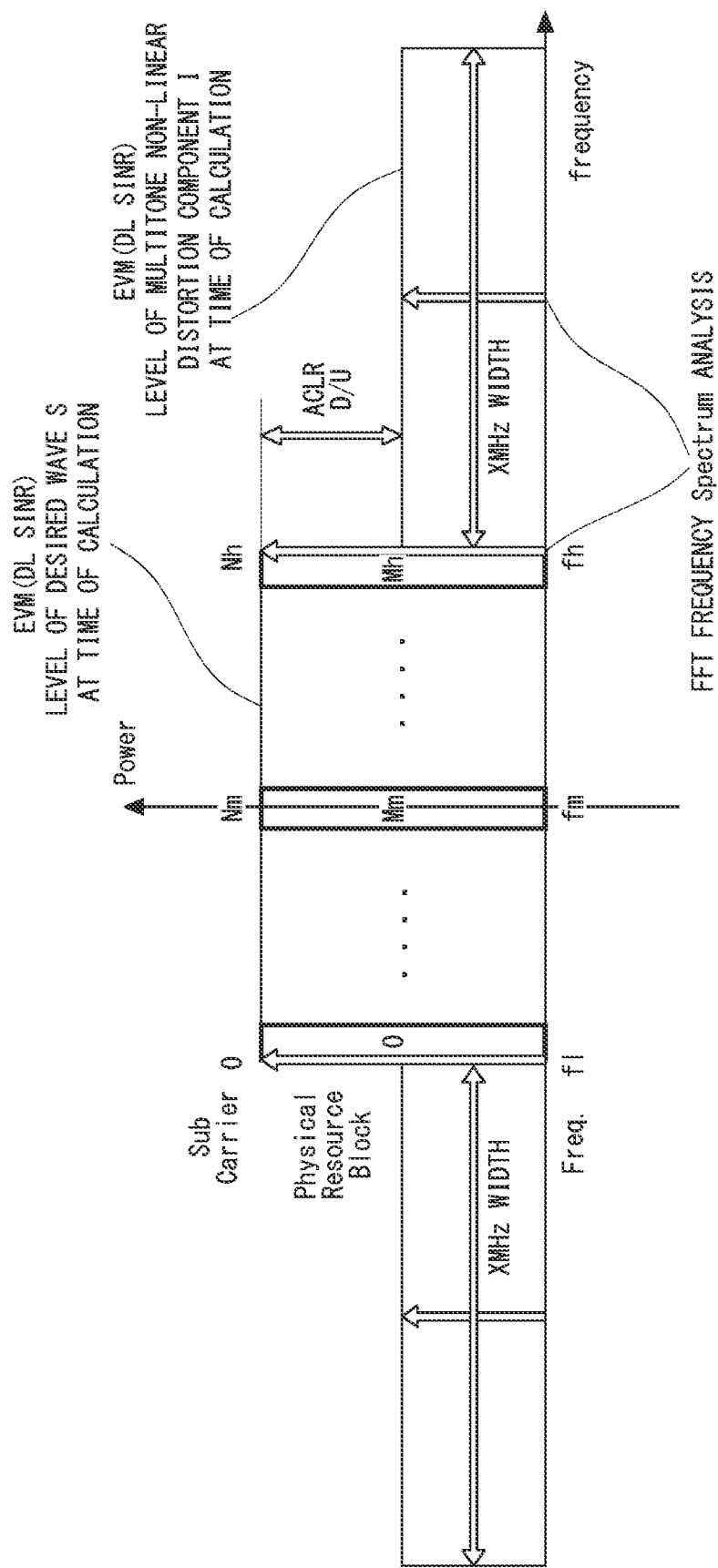
FIG. 9 is a graph illustrating a measurement signal of a fifth example embodiment.

FIG. 9 is a graph illustrating a measurement signal of the fifth example embodiment. As shown in FIG. 9, the measurement signal of the fifth example embodiment is a multitone signal not including the notch out band, unlike the measurement signal of the fourth example embodiment.

Figure 10:
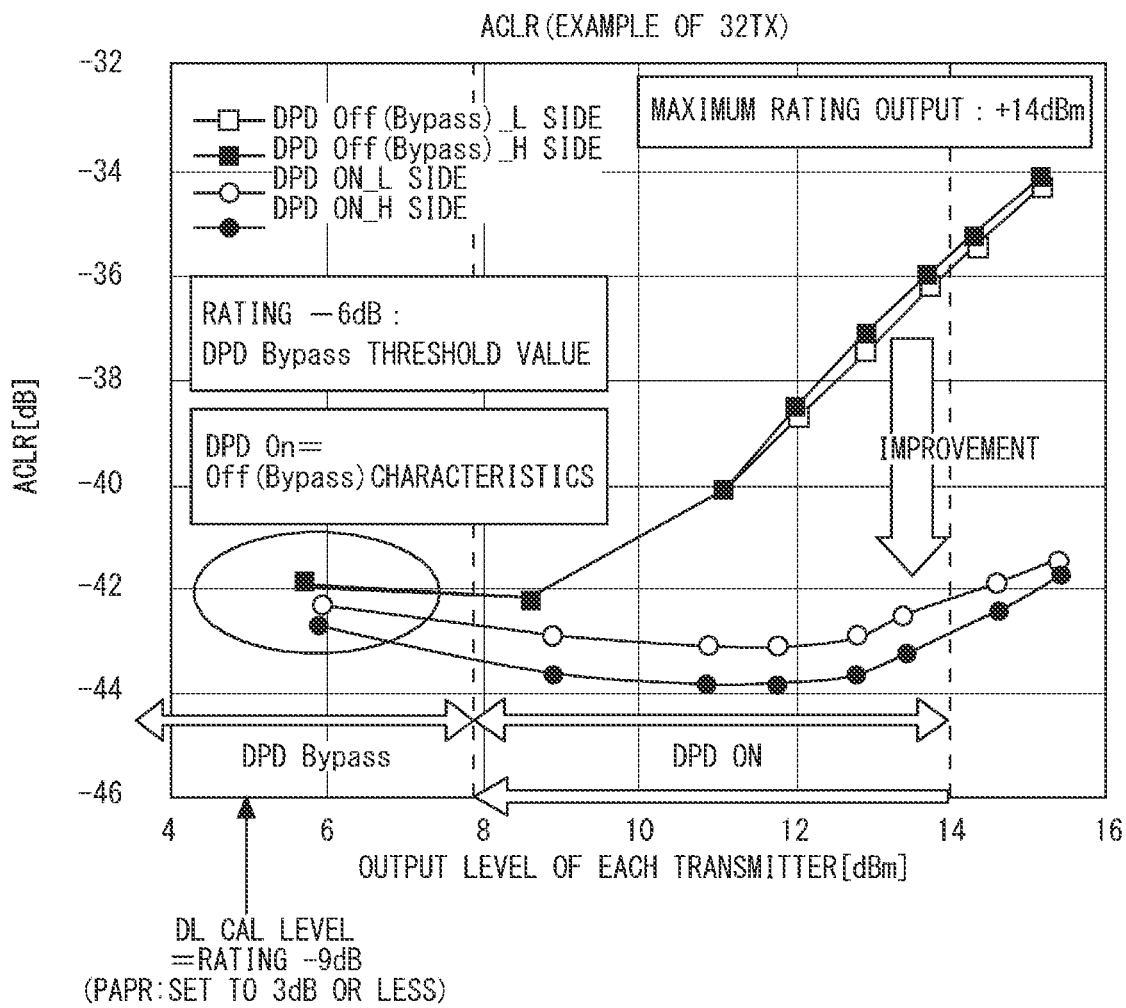
FIG. 10 is a graph illustrating a method of specifying an amplitude level of the measurement signal in the fifth example embodiment.

An amplitude level specifying unit 51C of the fifth example embodiment performs an FFT on a signal corresponding to the measurement signal having passed through the first input path L1 at each amplitude level of the measurement signal and a signal corresponding to the measurement signal having passed through the second input path L2 at each amplitude level of the measurement signal, and thus converting the respective signals into frequency domain signals. Then, the amplitude level specifying unit 51C detects both a level of an adjacent channel leakage power ratio/distortion component appearing in a side band of a multitone signal and a level of the multitone portion in the obtained frequency domain signal, and calculates a difference between the detected both levels as out-of-band ACLR. Then, the amplitude level specifying unit 51C specifies an amplitude level of the measurement signal at which the difference between the out-of-band ACLR corresponding to the measurement signal having passed through the first input path L1 and the out-of-band ACLR corresponding to the measurement signal having passed through the second input path L2 is equal to or less than a "third threshold value" (see FIG. 10). In other words, the amplitude level specifying unit 51C performs frequency spectrum analysis to specify the amplitude level of the measurement signal at which the above-described difference between the out-of-bands ACLR is equal to or less than the third threshold value. When the difference between the out-of-bands ACLR calculated in this way is equal to or less than the "third threshold value", it can be considered that there is no difference between the out-of-band ACLR of the measurement signal having passed through the first input path L1 and the out-of-band ACLR of the measurement signal having passed through the second input path L2. FIG. 10 is a graph illustrating a method of specifying the amplitude level of the measurement signal in the fifth example embodiment.

Sixth Example Embodiment

In a sixth example embodiment, demodulation analysis is performed instead of the spectrum analysis of the fourth example embodiment. A basic configuration of a radio communication device of the sixth example embodiment is similar to the basic configuration of the radio communication device 50 of the fourth example embodiment, and thus will be described with reference to FIG. 6. Differences between the radio communication device of the sixth example embodiment and the radio communication device of fourth example embodiment will mainly be described below.

A signal generator 51A of the sixth example embodiment outputs a "measurement signal" to the SW 41C via the multiplier 41B under control of the measurement control unit 51B.

Figure 11:
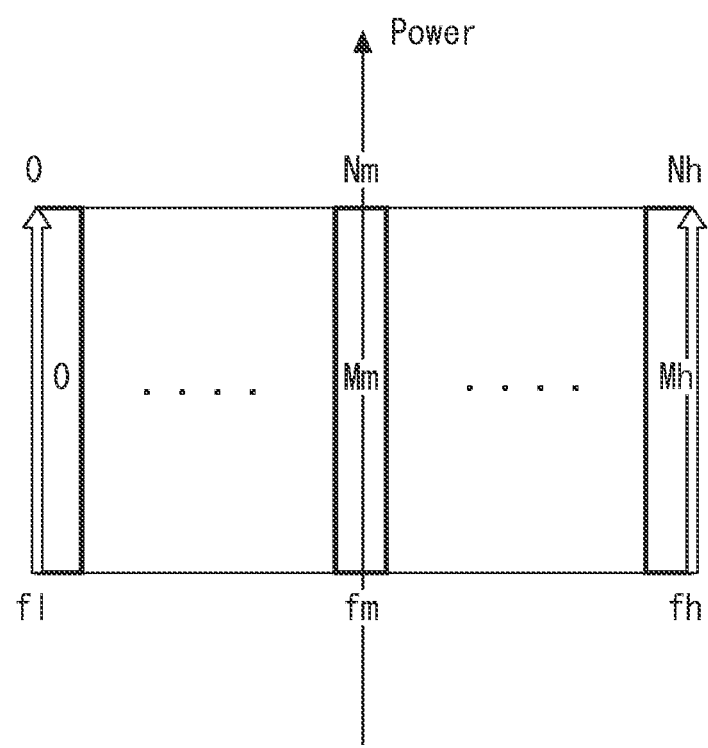
FIG. 11 is a view illustrating a measurement signal of a sixth example embodiment.

FIG. 11 is a view illustrating a measurement signal of the sixth example embodiment. The measurement signal of the sixth example embodiment is a multitone signal (OFDM signal) not including the notch out band, as in the measurement signal of the fifth example embodiment. However, in the sixth example embodiment, since the demodulation analysis is performed, test data is superimposed on each subcarrier of the measurement signal.

Figure 12:
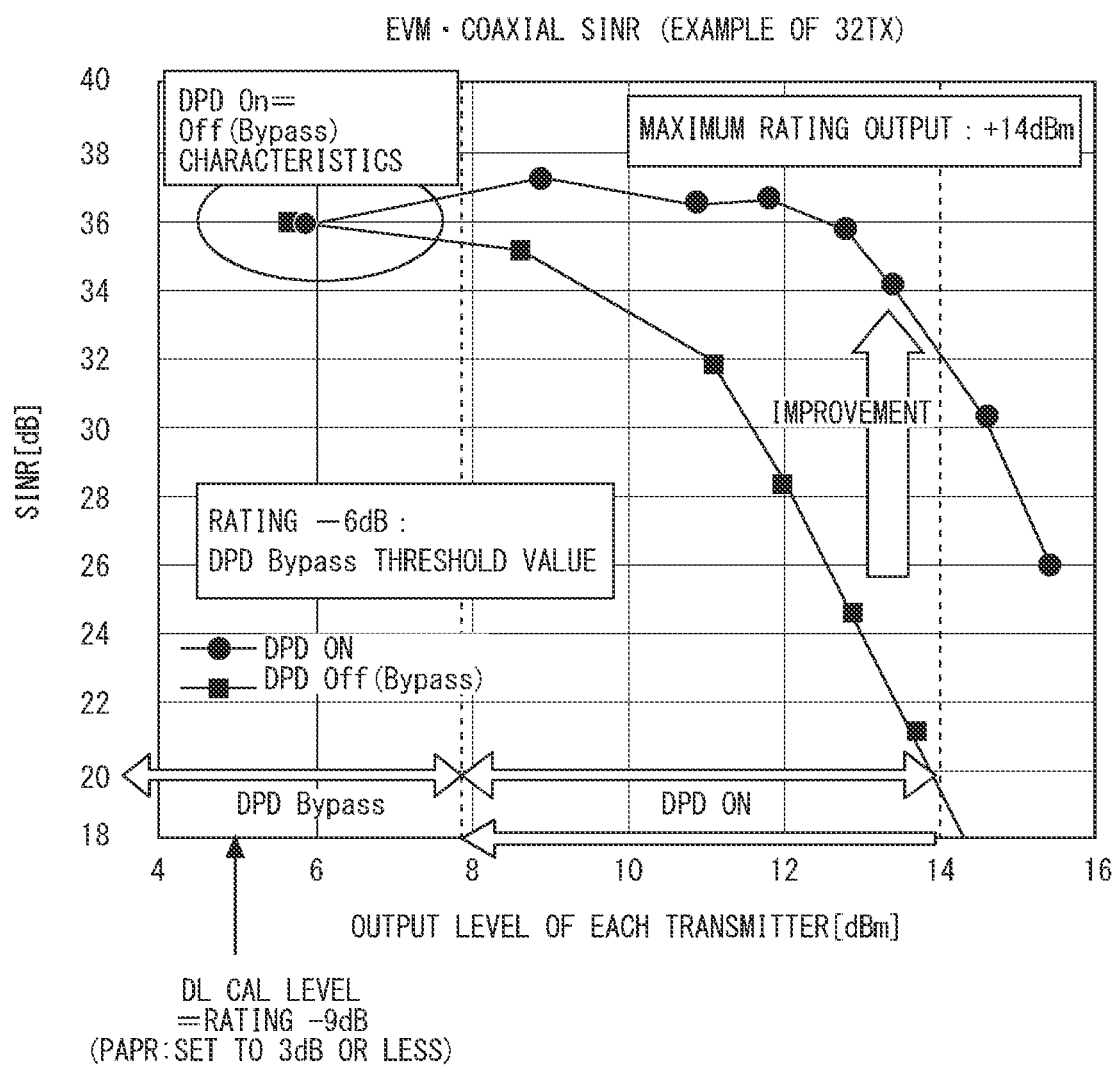
FIG. 12 is a graph illustrating a method of specifying an amplitude level of the measurement signal in the sixth example embodiment.

An amplitude level specifying unit 51C of the sixth example embodiment calculates an EVM (DL SINR) in a modulation band using a signal corresponding to the measurement signal having passed through the first input path L1 at each amplitude level of the measurement signal and a signal corresponding to the measurement signal having passed through the second input path L2 at each amplitude level of the measurement signal. In other words, an error vector between the phase and amplitude (that is, a symbol in a constellation) of the measurement signal output from the signal generator 51A and the phase and amplitude of the signal corresponding to the measurement signal having passed through the first input path L1 is an in-modulation band EVM corresponding to the first input path L1. Further, an error vector between the phase and amplitude of the measurement signal output from the signal generator 51A and the phase and amplitude of the signal corresponding to the measurement signal having passed through the second input path L2 is an in-modulation band EVM corresponding to the second input path L2. Then, the amplitude level specifying unit 51C specifies an amplitude level of the measurement signal at which a difference between the in-modulation band EVM corresponding to the measurement signal having passed through the first input path L1 and the in-modulation band EVM corresponding to the measurement signal having passed through the second input path L2 is equal to or less than a "fourth threshold value" (see FIG. 12). In other words, the amplitude level specifying unit 51C performs demodulation analysis to specify the amplitude level of the measurement signal at which the above-described difference between the in-modulation bands EVM is equal to or less than the fourth threshold value. When the difference between the in-modulation bands EVM calculated in this way is equal to or less than the "fourth threshold value", it can be considered that there is no difference between the in-modulation bands EVM of the measurement signal having passed through the first input path L1 and the in-modulation bands EVM of the measurement signal having passed through the second input path L2. FIG. 12 is a graph illustrating a method of specifying the amplitude level of the measurement signal in the sixth example embodiment.

Although the application invention has been described above with reference to the example embodiments, the application invention is not limited to the above example embodiments. The configuration and details of the application invention can be variously changed within the scope of the invention by those skilled in the art.

This application is based upon and claims the priority from Japanese Patent Application No. 2019-003196, filed on Jan. 11, 2019, the entire contents of which are incorporated herein.

REFERENCE SIGNS LIST 10 radio communication device
11 radio unit
12 control unit (control device)
13 path unit
14 DPD unit
20 radio communication device
21 radio unit 21A transmission/reception radio processing unit (TRX)
21B amplifier
21C coupler (directional coupler)
22 control unit (control device)
22A signal generator
22B DPD unit
22C IFFT unit
22D multiplier
23 optical transceiver
24 antenna element
25 CAL Network circuit unit
26 calibration signal receiving unit (CAL-RX)
30 baseband device
40 radio communication device
41 control unit (control device)
41A signal generator
41B multiplier
41C, 41D switch (SW)
50 radio communication device
51 control unit (control device)
51A signal generator
51B measurement control unit
51C amplitude level specifying unit
51D threshold value derivation unit

What is claimed is:

1. A control device comprising:
hardware including at least one processor and at least one memory;
a plurality of distortion compensation units implemented at least by the hardware and that correspond to a plurality of radio units, each of the distortion compensation units being configured to compensate for non-linear distortion with respect to a transmission baseband signal input to a corresponding radio units using reverse characteristics of non-linear distortion characteristics in the corresponding radio units; and
a plurality of path units implemented at least by the hardware and that are connected to the plurality of radio units, respectively, each of the path units including a first input path and a second input path, wherein
the first input path is a path on which the corresponding distortion compensation units is provided and through which the transmission baseband signal compensated for the non-linear distortion is input to the corresponding radio units, and
the second input path is a path through which a calibration signal for calibrating a phase and amplitude deviation between the radio units in the plurality of radio units is input to the corresponding radio units without passing through the distortion compensation units.

2. The control device according to claim 1, further comprising a calibration signal generator implemented at least by the hardware and that outputs the calibration signal having an amplitude level corresponding to a linear region of an amplifier included in the radio units, to which the second input path is connected, to the second input path.

3. The control device according to claim 1, further comprising:
a first switch configured to switch a connection target with the radio units between the first input path and the second input path; and
a second switch configured to switch a connection target with an input part of the path units between the first input path and the second input path, wherein
when an amplitude level of an input signal to the path units is equal to or larger than a first threshold value, the first switch switches the connection target with the radio units to the first input path, and the second switch switches the connection target with the input part of the path units to the first input path, and
when the amplitude level of the input signal to the path units is smaller than the first threshold value, the first switch switches the connection target with the radio units to the second input path, and the second switch switches the connection target with the input part of the path units to the second input path.

4. The control device according to claim 3, further comprising a calibration signal generator implemented at least by the hardware and that outputs the calibration signal having an amplitude level smaller than the first threshold value to the second switch.

5. The control device according to claim 3, further comprising:
a measurement signal outputter implemented at least by the hardware and that outputs a measurement signal to the path units;
a measurement control unit implemented at least by the hardware and that causes the measurement signal output units to ramp up an amplitude level of the measurement signal and to output sequentially the measurement signal, and that switches a connection destination of the first switch and the second switch while the measurement signal is input to the path units at each amplitude level;
an amplitude level specifying unit implemented at least by the hardware and that specifies an amplitude level of the measurement signal at which a difference between a first in-band EVM (Error Vector Magnitude) or a first adjacent channel leakage power when the measurement signal has passed through the first input path and the radio units and a second in-band EVM or a second adjacent channel leakage power when the measurement signal has passed through the second input path and the radio units is equal to or smaller than a second threshold value; and
a threshold value derivation unit implemented at least by the hardware and that derives the first threshold value based on the specified amplitude level.

6. The control device according to claim 5, wherein the amplitude level specifying units performs spectrum analysis on the measurement signal after having passed through the first input path and the radio units and the measurement signal after having passed through the second input path and the radio units to specify an amplitude level of the measurement signal at which the difference is equal to smaller than the second threshold value.

7. The control device according to claim 3, further comprising:
a measurement signal outputter implemented at least by the hardware and that outputs a measurement signal to the path units;
a measurement control unit implemented at least by the hardware and that causes the measurement signal output units to ramp up an amplitude level of the measurement signal and to output sequentially the measurement signal, and for switching a connection destination of the first switch and the second switch while the measurement signal is input to the path units at each amplitude level;
an amplitude level specifying unit implemented at least by the hardware and that specifies an amplitude level of the measurement signal at which a difference between a third in-band EVM when the measurement signal has passed through the first input path and the radio units and a fourth in-band EVM when the measurement signal has passed through the second input path and the radio units is equal to or smaller than a third threshold value; and a threshold value derivation unit implemented at least by the hardware and that derives the first threshold value based on the specified amplitude level.

8. The control device according to claim 7, wherein the amplitude level specifying units performs demodulation analysis on the transmission baseband signal after having passed through the first input path and the radio units to specify an amplitude level of the transmission baseband signal at which the difference is equal to smaller than the third threshold value.

9. A radio communication device comprising:
a plurality of antenna elements;
a plurality of radio circuits connected to the plurality of antenna elements, respectively; and
the control device according to claim 1.

* * * * *